United States Patent
Chen et al.

(10) Patent No.: US 7,209,226 B2
(45) Date of Patent: Apr. 24, 2007

(54) GRAVITY SENSOR

(75) Inventors: Cheng-Fang Chen, Taipei (TW); Cheng-Hong Su, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 365 days.

(21) Appl. No.: 10/861,386

(22) Filed: Jun. 7, 2004

(65) Prior Publication Data

US 2005/0270520 A1    Dec. 8, 2005

(51) Int. Cl.
*G01J 1/42* (2006.01)

(52) U.S. Cl. ............... 356/218; 250/231.13; 250/221; 250/237

(58) Field of Classification Search ............. 356/218; 250/231.13, 237 R, 221; 345/161–169, 157–158, 345/173–175
See application file for complete search history.

(56) References Cited

U.S. PATENT DOCUMENTS 6,097,374 A  *  8/2000  Howard .................... 345/168
7,079,112 B1 *  7/2006  Liebenow ................. 345/158

* cited by examiner

*Primary Examiner*—Layla G. Lauchman
*Assistant Examiner*—Tri Ton
(74) *Attorney, Agent, or Firm*—Birch, Stewart, Kolasch & Birch, LLP

(57) ABSTRACT

A gravity sensor has a photo interrupter and a gravity wheel. The photo interrupter has a housing, a cavity in the housing, a light emitter on one side of the housing and a light detector on the other side of the housing. The gravity wheel points in a direction of gravity and has a pivot at center thereof and pivotally arranged on the housing, a plumb at one edge of the gravity wheel and a plurality of through holes annularly arranged in the gravity wheel. The gravity wheel has a portion present in the cavity. An inclined angle of a test object is determined by calculating relative movement between the photo interrupter and the gravity wheel.

5 Claims, 6 Drawing Sheets

GRAVITY SENSOR

FIELD OF THE INVENTION

The present invention relates to a gravity sensor, and especially to a contactless gravity sensor to overcome a wear problem.

BACKGROUND OF THE INVENTION

The prior art position sensor in a joystick generally comprises a contact-type varistor controller. As shown in FIG. 1, the contact-type varistor controller 60 comprises two shielding plates 65 and 65', a control wheel 66 pivotally arranged between the two shielding plates 65 and 65', electro brushes 67 and 67' arranged on outer facers of the control wheel 66, varistors 68 and 68' annularly arranged on inner facers of the shielding plates 65 and 65', respectively.

However, the electro brushes 67 and 67' and varistors 68 and 68' may suffer from wear after long-term use. The contact-type varistor controller 60 is degraded and thus has a shorter work life.

SUMMARY OF THE INVENTION

It is an object of the present invention to provide a gravity sensor to overcome a wear problem by using a photo interrupter instead of a contact-type varistor.

It is another object of the present invention to provide a gravity sensor to calibrate a horizontal direction and to detect an inclined angle for a joystick or machine.

It is still another object of the present invention to measure an inclined angle of a test object by calculating relative movement between a photo interrupter and a gravity wheel.

It is still another object of the present invention to provide a plurality of gravity sensors to determine an inclined direction of a test object in a plurality of dimensions.

To achieve the above objects, the present invention provides a gravity sensor described as comprising the following. A photo interrupter includes a housing, a cavity in the housing, a light emitter on one side of the housing and a light detector on another side of the housing. A gravity wheel points in the direction of gravity and comprises a pivot which is at center thereof, and which is pivotally arranged on the housing, a plumb arranged at one edge of the gravity wheel and a plurality of through holes annularly arranged on the gravity wheel. The gravity wheel is partially located in the cavity. The light emitter is an infrared LED. The light detector has two photo transistors on a light receiving plane thereof.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the following detailed description and the accompanying drawings, which are given by way of illustration only, and thus are not limitative of the present invention, and wherein.

DETAILED DESCRIPTION OF THE INVENTION

Figure 1:
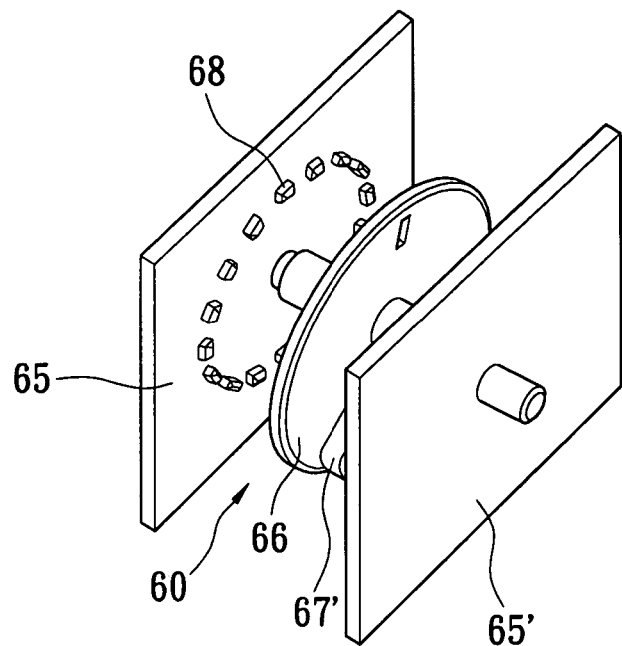
FIG. 1 shows a perspective view of the prior art contact-type varistor controller.
Figure 2:
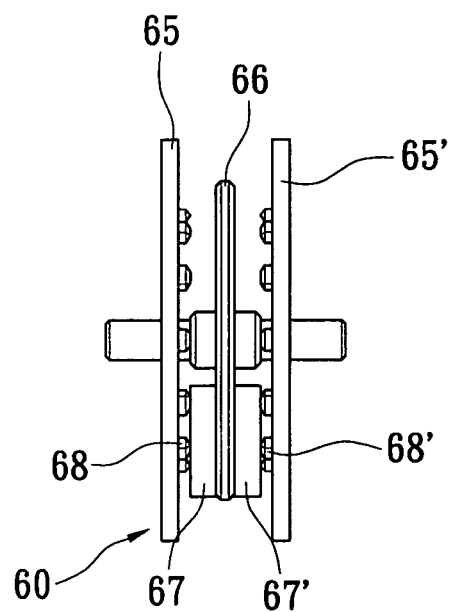
FIG. 2 shows a cross-sectional view of the prior art contact-type varistor controller.
Figure 3:
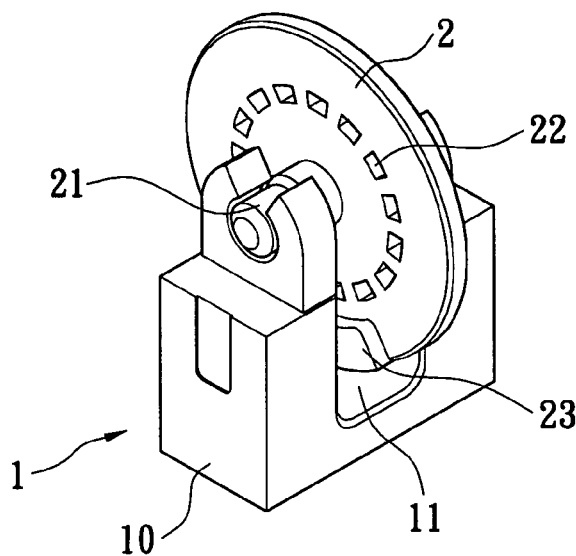
FIG. 3 shows a perspective view of the gravity sensor according to the present invention.
Figure 4:
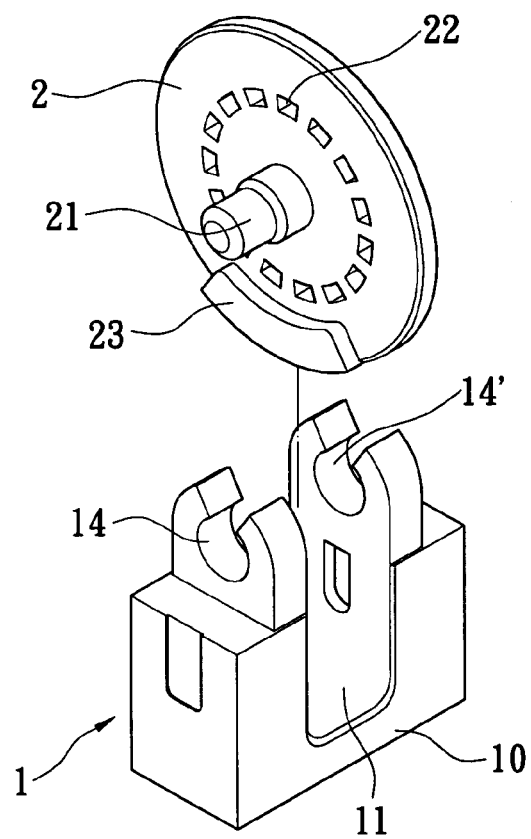
FIG. 4 shows an exploded view of the gravity sensor according to the present invention.
Figure 5:
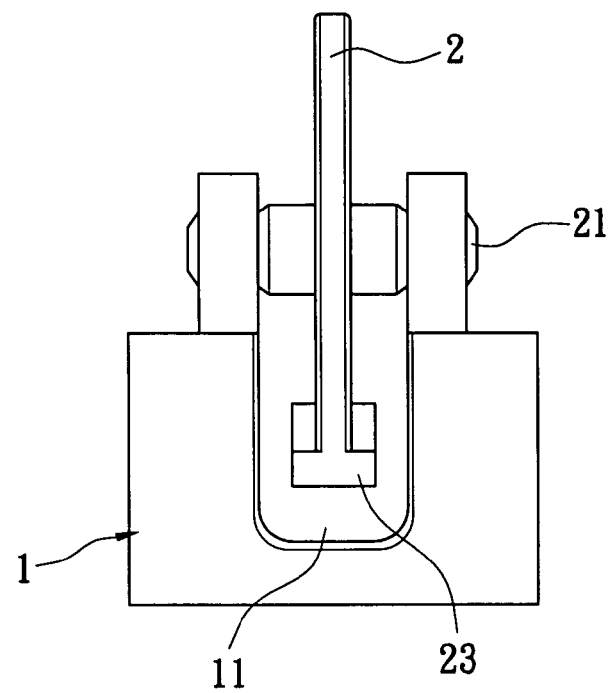
FIG. 5 shows a cross-sectional view of the gravity sensor according to the present invention.
Figure 6:
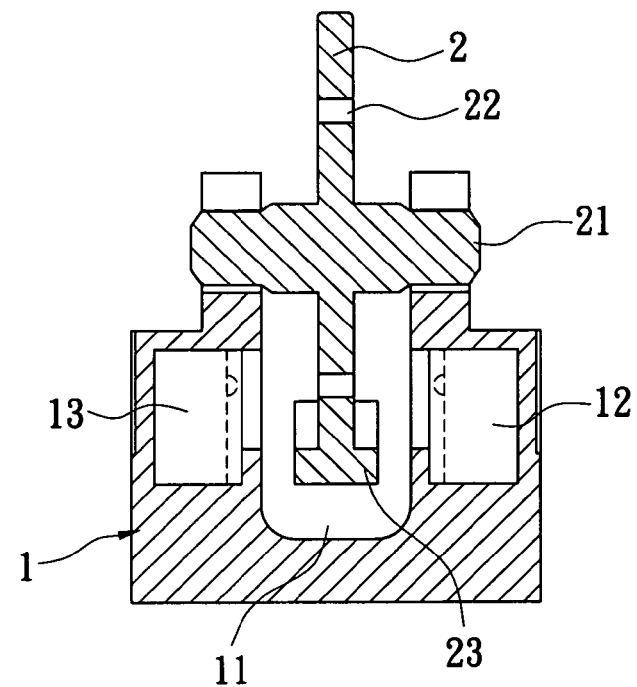
FIG. 6 shows another cross-sectional view of the gravity sensor according to the present invention.

The gravity sensor has extensive application. For example, the gravity sensor can be used in a joystick to detect an inclined angle of the joystick. With reference to FIGS. 3 to 8, the gravity sensor according to the present invention mainly comprises a photo interrupter 1 and a gravity wheel 2. The photo interrupter 1 comprises a housing 10, a cavity 11 in the housing 10, a light emitter 12 on one side of the housing 10 and a light detector 13 on the other side of the housing 10. The light emitted from the light emitter 12 will be directly detected by the light detector 13 if there is no obstacle which is present in the cavity 11. Alternatively, the output of the light detector 13 will change if there is an obstacle which is present in the cavity 11. In a preferred embodiment of the present invention, the light emitter 12 can be an infrared light emitting diode (LED), and the light detector 13 comprises two photo transistors S1 and S2 on a light receiving plane thereof to generate a serial phase signal. The housing 10 further comprises two slots 14 and 14' in two lateral topsides of the cavity 11.

Figure 7:
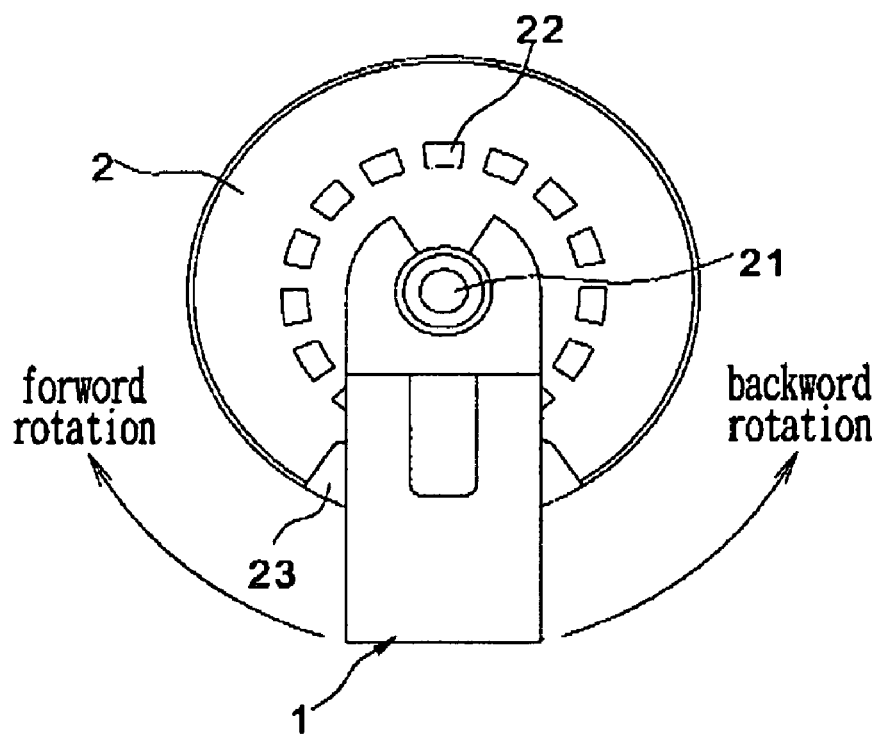
FIG. 7 illustrates operation of the gravity sensor according to the present invention.
Figure 8:
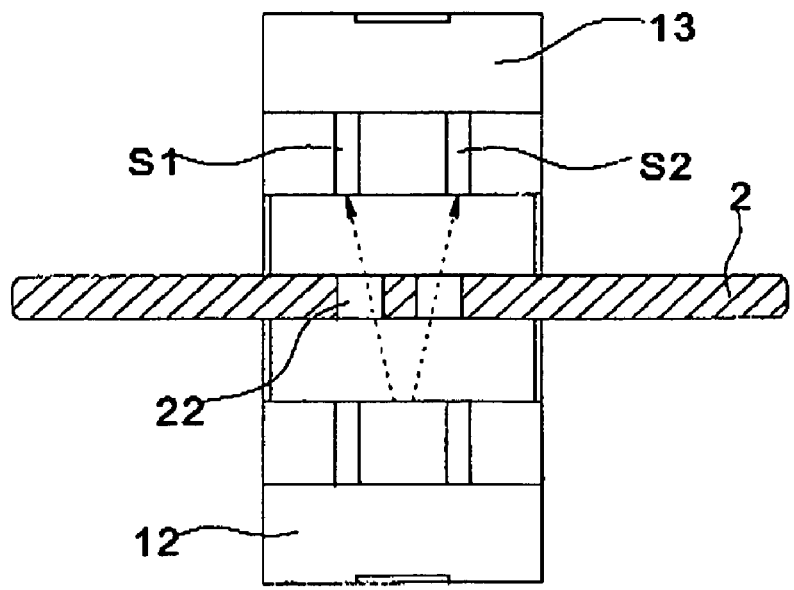
FIG. 8 illustrates operation of the photo interrupter according to the present invention.

The gravity wheel 2 comprises a pivot 21 at center thereof, a plurality of through holes 22 annularly arranged in the gravity wheel 2 and a plumb 23 arranged at one edge of the gravity wheel 2. The pivot 21 is pivotally arranged in the slots 14 and 14'. The pitch between adjacent through holes 22 can be adjusted according to a desired resolution. The plumb 23 keeps pointing in the direction of gravity during movement of the photo interrupter 1 as shown in FIG. 7.

When the two photo transistors S1 and S2 detect light emitted from the light emitter 12 and passing through the through holes 22, corresponding serial phase signals are generated. More particularly, two photo transistors S1 and S2 generate an ON signal when receiving a light, and generate an OFF signal when not receiving the light. The forward and backward inclined angles can be calculated with reference to the serial phase signals and number of the through holes 22.

Figure 9:
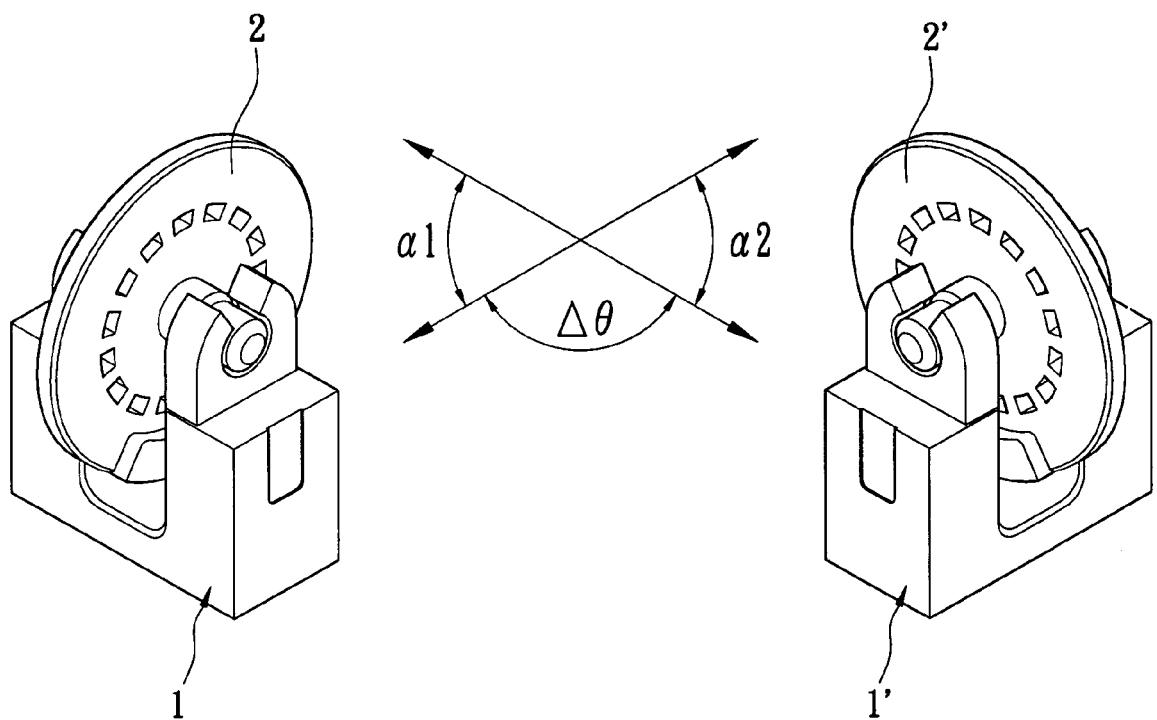
FIG. 9 is a schematic view showing two sets of gravity sensors.
Figure 10:
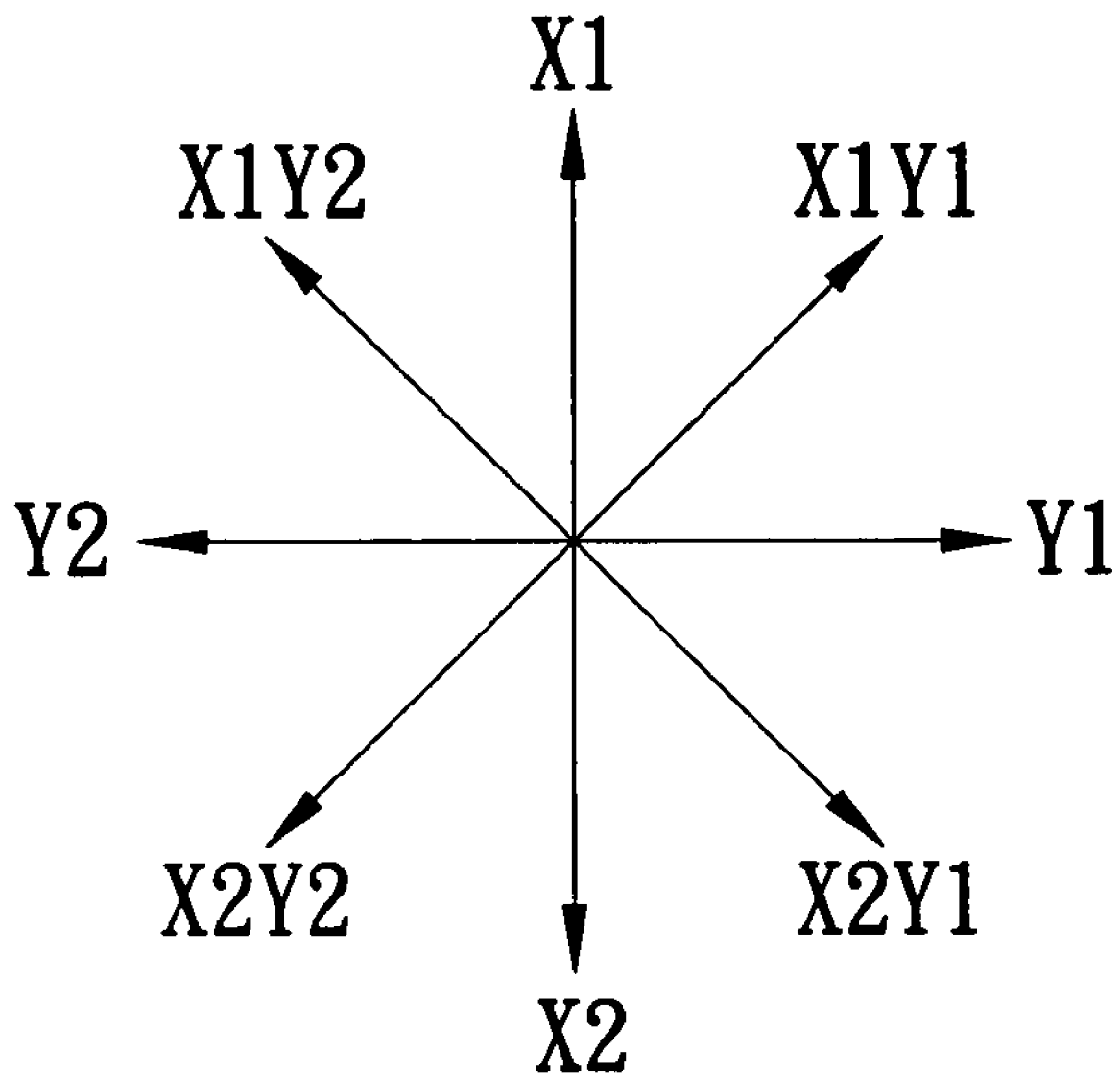
FIG. 10 shows the inclined direction determined by operation as shown in FIG. 8.

FIG. 9 is a schematic view showing two sets of gravity sensors provided in a joystick to detect 2-dimentional movements. Each of the gravity sensors comprises a photo interrupter 1 (1') and a gravity wheel 2 (2') to detect a directional angle α1 (α2). The directional angles α1 and α2 can be used to calculate movements in X and Y directions.

Moreover, the resolution of the gravity sensor can be adjusted to control the precision of a detected rotation angle Δθ.

Moreover, the light detector 13 can be connected to a controller (not shown) for use in horizontal correction for a machine.

To sum up, the present invention has the following advantages:

1. The wear problem can be overcome by using a photo interrupter instead of a contact-type varistor.
2. The resolution can be controlled by adjusting the pitch of the through hole in the wheel.
3. The design can be simplified with the employment of a gravity sensor.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A gravity sensor, comprising
   a photo interrupter having a housing, a cavity in the housing, a light emitter on one side of the housing and a light detector on the other side of the housing; and
   a gravity wheel fixed in a direction of gravity, the gravity wheel having a pivot at a center thereof, a plumb at one edge thereof, and a plurality of through holes annularly arranged thereon, and being pivotally ranged on the housing with a portion of the gravity wheel being present in the cavity,
   whereby an inclined angle of a test object is determined by calculating relative movement between the photo interrupter and the gravity wheel, whereby the photo interrupter is rotated relative to the gravity wheel.

2. The gravity sensor as in claim 1, wherein the housing has two slots on two opposite sides thereof.

3. The gravity sensor as in claim 1, wherein the light emitter is an infrared LED.

4. The gravity sensor as in claim 1, wherein the light detector has two photo transistors on a light receiving plane thereof.

5. The gravity sensor as in claim 1, wherein the test object is a joystick.

* * * * *